(12) United States Patent
Haller (10) Patent No.: US 9,180,792 B2
(45) Date of Patent: Nov. 10, 2015

(54) COMMERCIAL VEHICLE SEAT HAVING A LOCKING MEMBER

(71) Applicant: GRAMMER AG, Amberg (DE)

(72) Inventor: Erwin Haller, Birgland (DE)

(73) Assignee: Grammer AG, Amberg (DE)

( * ) Notice: Subject to any disclaimer, the term of this patent is extended or adjusted under 35 U.S.C. 154(b) by 0 days.

(21) Appl. No.: 14/109,425

(22) Filed: Dec. 17, 2013

(65) Prior Publication Data

US 2014/0167471 A1    Jun. 19, 2014

(30) Foreign Application Priority Data

Dec. 18, 2012 (DE) .................. 10 2012 112 529

(51) Int. Cl.
| | | |
|---|---|---|
| *A47C 1/00* | (2006.01) | |
| *B60N 2/015* | (2006.01) | |
| *B60N 2/14* | (2006.01) | |
| *B60N 2/50* | (2006.01) | |
| *B60N 2/06* | (2006.01) | |

(52) U.S. Cl.
CPC *B60N 2/015* (2013.01); *B60N 2/06* (2013.01); *B60N 2/062* (2013.01); *B60N 2/14* (2013.01); *B60N 2/146* (2013.01); *B60N 2/508* (2013.01); *B60N 2/509* (2013.01); *B60N 2205/20* (2013.01)

(58) Field of Classification Search
CPC .................................. A47C 3/18; B60N 2/146
USPC ................................................... 297/344.22
See application file for complete search history.

(56) References Cited

U.S. PATENT DOCUMENTS

| | | | | |
|---|---|---|---|---|
| 2,854,065 A | * | 9/1958 | Fox ............................... | 248/425 |
| 3,572,817 A | | 3/1971 | Colautti et al. | |
| 3,622,202 A | * | 11/1971 | Brown ....................... | 297/344.1 |
| 3,659,895 A | * | 5/1972 | Dresden ..................... | 296/65.05 |
| 5,568,960 A | * | 10/1996 | Oleson et al. ............. | 297/344.22 |
| 5,853,221 A | * | 12/1998 | Thoman et al. .......... | 297/344.24 |
| 5,882,076 A | * | 3/1999 | Garelick et al. ......... | 297/344.18 |
| 6,021,989 A | * | 2/2000 | Morita et al. .............. | 248/349.1 |

(Continued)

FOREIGN PATENT DOCUMENTS

| | | | |
|---|---|---|---|
| CA | 2337695 A1 | * | 8/2001 |
| CN | 202480912 | | 10/2012 |

(Continued)

OTHER PUBLICATIONS

U.S. Appl. No. 14/109,17, filed Dec. 17, 2013, Haller.

(Continued)

*Primary Examiner* — Laurie Cranmer
(74) *Attorney, Agent, or Firm* — Sheridan Ross P.C.

(57) ABSTRACT

The invention relates to a commercial vehicle seat with a seat portion, with a backrest portion and with a seat substructure for mounting on a body portion of a commercial vehicle, wherein said seat substructure has locking means for securing against an unintended rotary movement of a rotary adjustment means for rotating at least the seat portion relative to the body portion, wherein the locking means comprises a locking member that is supported so as to be translationally displaceable along a displacement axis, for fixing the rotary adjustment means, and wherein said locking member comprises a base body member secured against rotation about the displacement axis, the base body height of which base body member is at least two to four times, preferably more than six times smaller than the base body width thereof.

12 Claims, 5 Drawing Sheets

(56) References Cited

U.S. PATENT DOCUMENTS

| | | | | |
|---|---|---|---|---|
| 6,164,722 A | * | 12/2000 | Mabey | 297/344.22 |
| 6,325,456 B1 | * | 12/2001 | Carnahan | 297/344.24 |
| 6,575,420 B2 | * | 6/2003 | Yoshida et al. | 248/425 |
| 6,877,811 B1 | * | 4/2005 | Garelick | 297/344.22 |
| 7,108,325 B2 | * | 9/2006 | Williamson et al. | 297/344.24 |
| 7,950,740 B2 | * | 5/2011 | Bunea et al. | 297/344.23 |
| 2004/0066074 A1 | * | 4/2004 | Ovitt | 297/344.21 |
| 2013/0193729 A1 | * | 8/2013 | VanMiddendorp et al. | 297/311 |

FOREIGN PATENT DOCUMENTS

| | | |
|---|---|---|
| DE | 1116987 | 11/1961 |
| DE | 2828503 | 1/1980 |
| DE | 3127625 | 6/1982 |
| DE | 3708399 | 9/1987 |
| DE | 4415933 | 11/1994 |
| DE | 69721383 | 3/2004 |
| DE | 60118068 | 8/2006 |
| DE | 202006010184 | 9/2006 |
| DE | 102007021141 | 9/2008 |
| EP | 1659021 | 5/2006 |
| GB | 525663 | 9/1940 |
| JP | H10-217811 | 8/1998 |
| JP | 2003-063288 | 3/2003 |
| JP | 2004-203160 | 7/2004 |
| KR | 10-2013-0056092 | 5/2013 |
| WO | WO 2004/056605 | 7/2004 |
| WO | WO 2007/028473 | 3/2007 |
| WO | WO 2010/114966 | 10/2010 |

OTHER PUBLICATIONS

U.S. Appl. No. 14/109,166, filed Dec. 17, 2013, Ott.
U.S. Appl. No. 14/109,493, filed Dec. 17, 2013, Haller.
U.S. Appl. No. 14/109,540, filed Dec. 17, 2013, Haller.
Official Action (no English translation available) for German Patent Application No. 102012112529.5 dated Oct. 31, 2013, 3 pages.
Extended Search Report for European Patent Application No. 13196538.6, dated Jun. 25, 2015, 3 pages.

* cited by examiner

COMMERCIAL VEHICLE SEAT HAVING A LOCKING MEMBER

CROSS-REFERENCE TO RELATED APPLICATIONS

This application claims the benefit of German Application No. 10 2012 112 529.5 filed Dec. 18, 2012, the disclosure of which is incorporated herein by reference.

DESCRIPTION

The invention relates to a commercial vehicle seat with a seat portion, with a backrest portion and with a seat substructure for mounting on a body portion of a commercial vehicle, wherein the seat substructure includes a locking means for securing against an unintentional rotary movement of a rotary adjustment means for rotating at least the seat portion relative to the body portion, wherein the locking means comprises a locking member which is supported so as to be translationally displaceable along a displacement axis, for fixing the rotary adjustment means.

Generic vehicle seats having corresponding rotary adjustment means that can be fixed with regard to a rotary movement by means of a locking means are well known from the prior art. These locking means are often provided with a locking unit having a bolt member, by means of which two components of the rotary adjustment means, which are supported so as to be rotatable relative to each other, can be fixed in relation to each other. As a rule, the locking unit is located on the side of a component that is fixed against rotation, whereas on the component that is rotationally supported in correspondence therewith, an engagement means such as for example a bore or the like is provided, into which the bolt member can be engaged when the rotary adjustment means is to be secured against an unintended rotary movement of the component that is rotatably supported. What is of disadvantage here is that the bolt member can frequently be engaged only with insufficient precision, which can also result in a delayed fixing of the rotary adjustment means. Of particular disadvantage is moreover a locking that is not free of play, in particular if the locking means have already been in use in commercial vehicles for a number of years. Moreover, previous locking means, and thus also a seat substructure for the vehicle seat, frequently have a very high design height.

It is the object of the invention to develop generic locking means on vehicle seats in such a way that at least the above-mentioned disadvantages are overcome.

This object of the invention is achieved by means of a commercial vehicle seat with a seat portion, with a backrest portion and with a seat substructure for mounting on a body portion of a commercial vehicle, wherein the seat substructure has a locking means for securing against an unintended rotary movement of a rotary adjustment means for rotating at least the seat portion relative to the body portion, wherein the locking means comprise a locking member that is supported so as to be translationally displaceable along a displacement axis, for fixing the rotary adjustment means, and wherein the locking member comprises a base body member that is secured against rotation about the displacement axis, the base body height of which base body member is at least two or four times, preferably more than six times lower than the base body width thereof.

By means of such a base body member that is secured against rotation, the locking member can on the one hand be defined and therefore guide along the displacement axis in a substantially more precise manner than hitherto. In particular, if the locking member has a tooth member unit, tooth members of the tooth member unit can always be held in the space precisely positioned for an engagement, because according to the invention, any rocking of the locking member about the locking axis can be eliminated.

On the other hand, the design profile of the locking member is particularly flat due to the extremely low height of the base body member, as a result of which also the design profile of the locking means can be kept extremely low. Ultimately, this enables the seat substructure to be either designed to be lower, or the installation space saved on the locking unit is available for other components or modules of the seat substructure.

Even just for these reasons alone it is advantageous for the locking member to be designed as a flat-slide member.

It will be understood that the present locking member is guided in a manner well secured against rotation even by the mere shape of the base body member alone. In addition to that, if the locking member or respectively the base body member secured against rotation about the axis of displacement also has a slot and key unit, by means of which it is guided along the axis of displacement, in particular the guiding precision can be enhanced even further.

Here, the slot portion and the key portion of the slot and key unit extend in the direction of the displacement axis, so that a guide of a very simple design can be achieved.

It will be understood that in the present case, a slot portion or a key portion of the slot and key unit may be provided on the locking member or respectively on the base body member thereof. Also a combination of a slot portion and a key portion is possible on the locking member.

Ideally, however, the locking member comprises only key portions of the slot and key unit, so that it can be designed to be even more rigid. This may have a positive effect in particular on a rotary adjustment means that can be fixed as far as possible without play.

In particular if these key portions are provided on two oppositely arranged surfaces of the locking member, an even further improved guide of this locking member may be achieved. Ideally, the oppositely arranged key portions are here located on the same level, preferably on a common vertical level.

In so far, a preferred embodiment variant provides for the locking member to have a key portion of a slot and key unit at least on two sides, preferably on the upper and the underside thereof. As a result, the rotary adjustment means can be secured to be without play in particular also in respect of the effect of particularly large locking forces to be accommodated, as a result of which in particular also the seating comfort for a passenger can be substantially enhanced.

If the locking member moreover has at least one tooth member for engaging in gear ring toothing, which is at least partially formed by a key portion of a slot and key unit, a good locking security can be ensured.

Locking precision of the locking means can be enhanced even further if the locking member has a tooth member unit with three tooth members, by means of which the locking member can engage in gear ring toothing of a preferably stationary gear ring. As a result, the locking member can moreover be supported without play in a structurally particularly simple manner in both rotary directions of the rotary adjustment means.

In addition it is advantageous if the locking means has a locking member comprising a tooth member unit and a stationary gear ring comprising gear ring toothing, wherein for locking the rotary adjustment means, the locking member is in engagement with at least two gear ring tooth members of the gear ring toothing. As a result, the risk of the rotary adjustment means being locked with play can be reduced even further.

For example, the gear ring has a tooth pitch that is defined to be 7.5°, in which the locking member can engage with its three tooth members. The tooth pitch that is defined to be 7.5°, however, is merely a first embodiment variant. Other tooth pitches are also possible.

A further advantageous embodiment variant provides for the locking means to comprise an engagement spring member for engaging a tooth member unit of the locking member in gear ring toothing that is mounted to be stationary, wherein the engagement member is provided horizontally on the level of the tooth member unit. As a result, the design height of the locking means can also be kept advantageously low.

In the present case, the engagement spring member is preferably implemented as a compression coil spring.

If the locking member is supported in a spring-pretensioned manner between a first guide plate member and a second guide plate member of the locking means, on the one hand the engagement security of the locking member can be further enhanced and the risk of an unintended unlocking can be reduced, and on the other hand the design height of the locking means can be reduced even further, in particular as a result of the two guide plate members.

Ideally, the two guide plate members are realised in a structurally simple manner by means of a top and a bottom shell portion of the rotary adjustment means, so that the design height of the seat substructure can be generally substantially reduced.

The design of the present locking means can further be kept simple if the locking means comprises a gear ring plate member having a gear ring with gear ring toothing that is formed to be concave, wherein the gear ring plate member is mounted between a first and a second guide plate member of the locking means.

Advantageously, these two guide plate members can be linked to each other, in particular screwed together, in such a way that the gear ring plate member therebetween is retained in a structurally simple manner in such a way that the two guide plate members can be rotated together relative to the gear ring plate member.

If the first guide plate member comprises a first ball bearing plate member of the rotary adjustment means and the second guide plate member comprises a second ball bearing plate member of the rotary adjustment means, wherein the guide plate members implement circular ball tracks of the rotary adjustment means, an extremely favourable component reduction can be achieved on the seat substructure.

A further advantageous component reduction can be achieved if the gear ring plate member implements a further ball bearing plate member of the rotary adjustment means, which has circular ball tracks.

A low-wear and therefore continuously play-free locking of the rotary adjustment means can be achieved if two oppositely arranged tooth flanks of two adjacent gear ring toothing members of a gear ring plate member of the locking means enclose an angle of 10°.

In particular, the flank angle of the tooth geometry in relation to the locking member is implemented in such a way that this tooth geometry, in cooperation with the gear ring, ensures a secure and play-free locking, and this locking is at the same time smooth-running and can be unlocked in particular without any self-jamming.

Moreover, the locking unit can be operated in a structurally very simple manner if the locking member is disengaged by means of a Bowden cable along the displacement axis against the spring force of the engagement spring member. To this end, the Bowden cable is fixed on the one hand to the locking member and is connected on the other hand to a handle located near the seat portion. It will be understood that also a mechanism implemented in a different manner in relation to this can be used.

Further advantages, aims and characteristics of the present invention will be explained below by means of the attached figures and the following description, wherein a commercial vehicle seat having locking means comprising a base body member secured against rotation about a displacement axis is depicted and described. In the figures.

Figure 1:
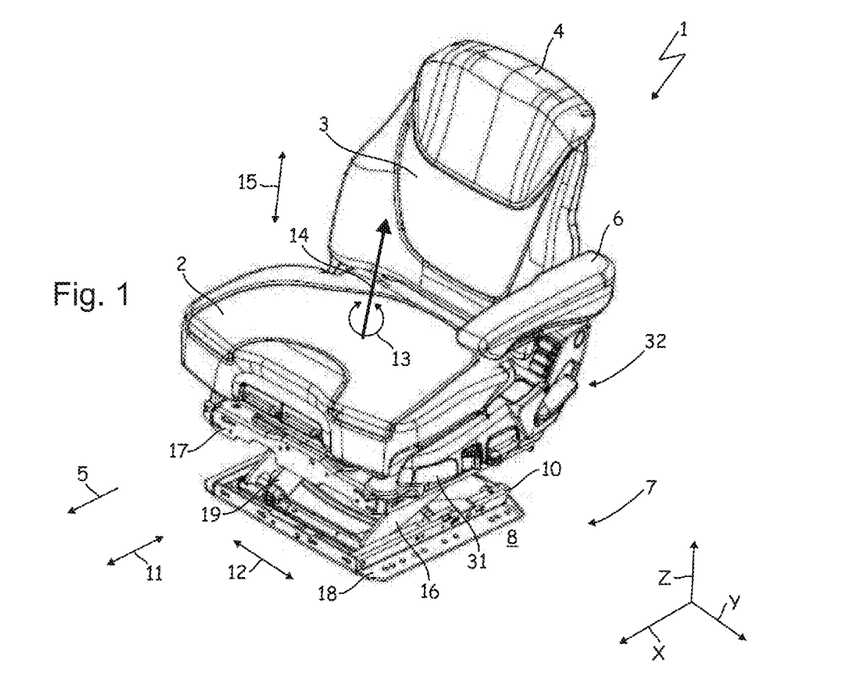
FIG. 1 shows a schematic and perspective view of a commercial vehicle seat having a seat substructure comprising a horizontal movement device, which comprises a locking means with a base body member secured against rotation about the displacement axis, the height of which base body member is at least six times lower than the width thereof.

The commercial vehicle seat 1 shown in FIG. 1 comprises a seat portion 2 for a passenger to sit on and a backrest portion 3 for supporting the passenger at the back. In this embodiment example, the backrest portion 3 is also equipped with a headrest portion 4. If viewed in the forward driving direction 5, an armrest portion 6 is additionally fixed to the backrest portion 3 on the right-hand side. Further, the commercial vehicle seat 1 comprises a seat substructure 7, by means of which the commercial vehicle seat 1 is fastened in its entirety to a body portion 8 such as for example a cabin floor of a commercial vehicle cabin.

In order to adapt the commercial vehicle seat 1 in various ways to the most varied requirements of use of the passenger and also in order to be able to offer the best possible seating comfort, the seat substructure 7 in this embodiment example has a horizontal movement device 9 and a vertical movement device 10.

By means of the horizontal movement device 9, at least the seat portion 2 and components associated therewith, such as for example the backrest portion 3, can be translationally moved in the longitudinal adjustment direction 11 (x axis) and translationally moved in the lateral adjustment direction 12 (y axis) and rotationally moved in the rotary adjustment direction 13 about a vertical axis 14 (z axis), as will be explained below. In this embodiment example, due to its compact design, the horizontal movement device 9 merely has a very low structural height of 57 mm.

By means of the vertical movement device 10, at least the seat portion 2 and components associated therewith, such as precisely the backrest portion 3, can be translationally moved in the vertical adjustment direction 15 in relation to the vertical axis 14. To this end, the vertical movement device 10 comprises a scissor-like frame 16 which is mounted between a ceiling plate 17 carrying the horizontal movement device 9, the vertical movement device 10 and a baseplate 18 of the vertical movement device 10 in such a way that the horizontal movement device 9 is supported to be vertically moveable relative to the baseplate 18. Further, the vertical movement device 10 still comprises a damper spring unit 19 for spring-mounting and damping a vertical movement on the commercial vehicle seat 1 in the vertical direction 15.

Figure 2:
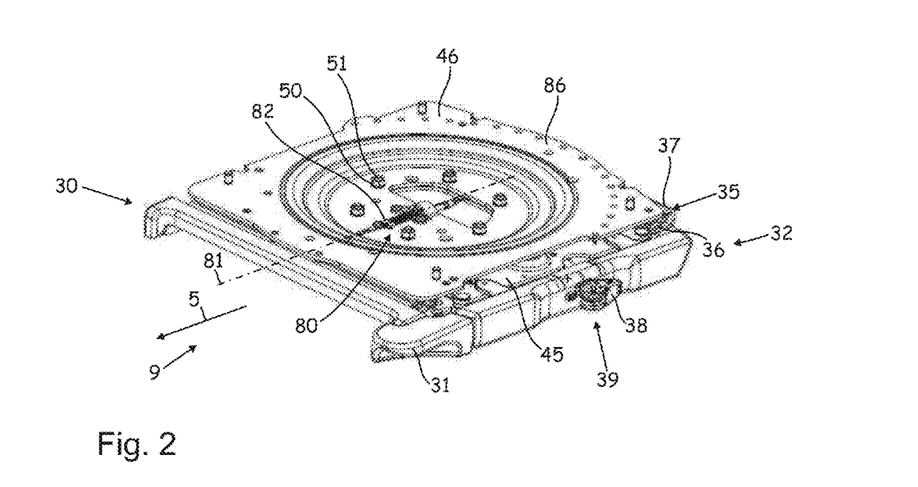
FIG. 2 shows a schematic and perspective view of the horizontal movement device of the seat substructure of the commercial vehicle seat from FIG. 1.
Figure 3:
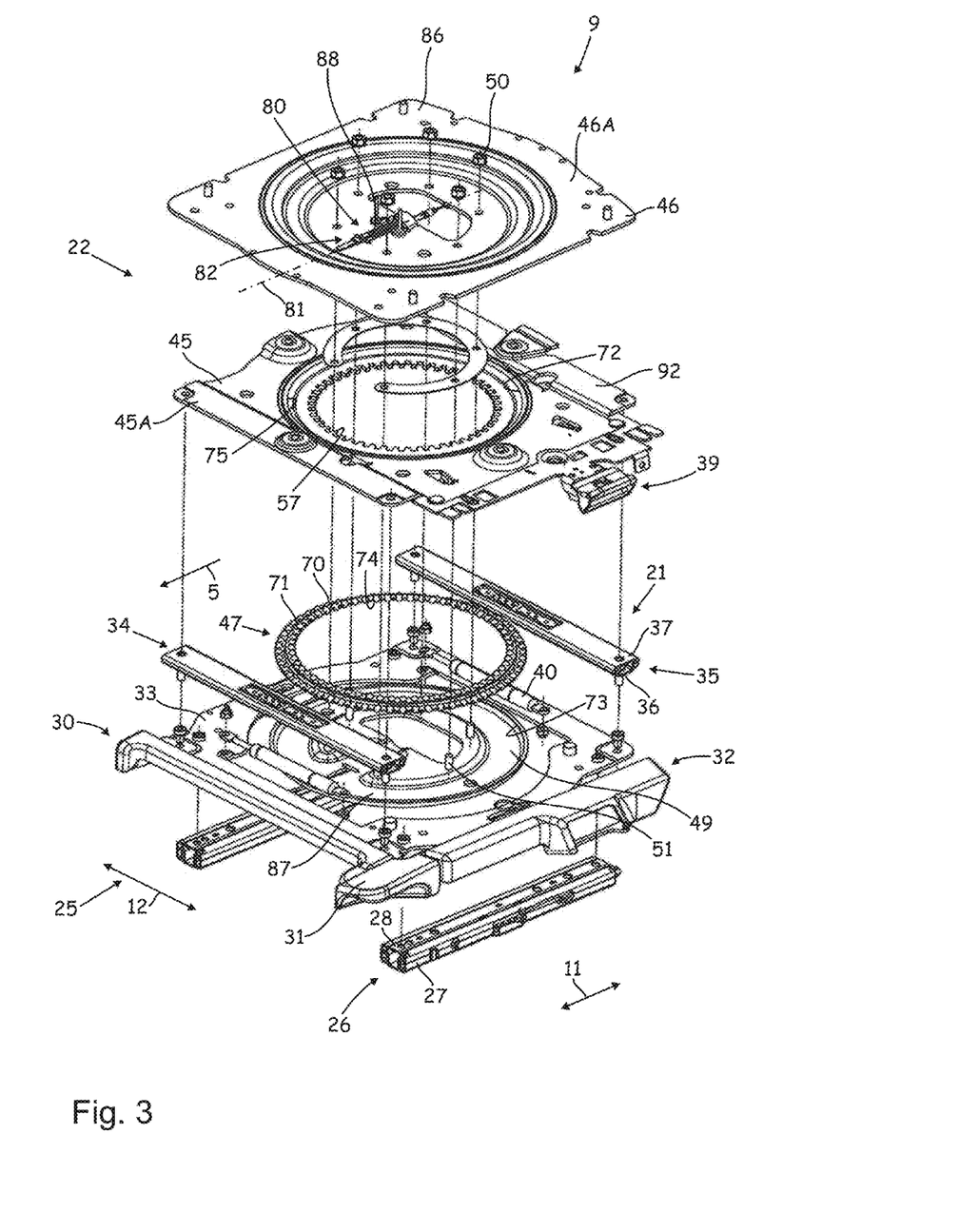
FIG. 3 shows a schematic and exploded view of the horizontal movement device from FIGS. 1 and 2.
Figure 4:
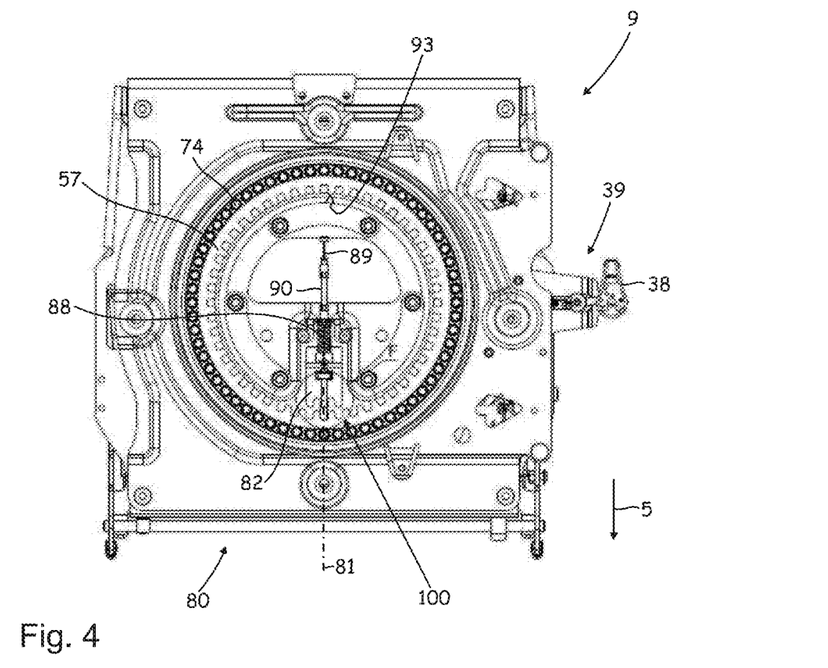
FIG. 4 shows a schematic top view of the locking means integrated in the horizontal movement device, which has a locking member disengaged from a gear ring.
Figure 5:
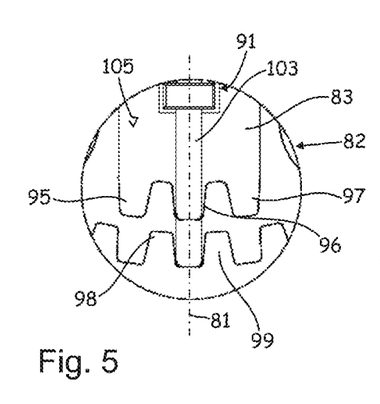
FIG. 5 shows a schematic detailed view of the locking member disengaged from the gear ring.
Figure 6:
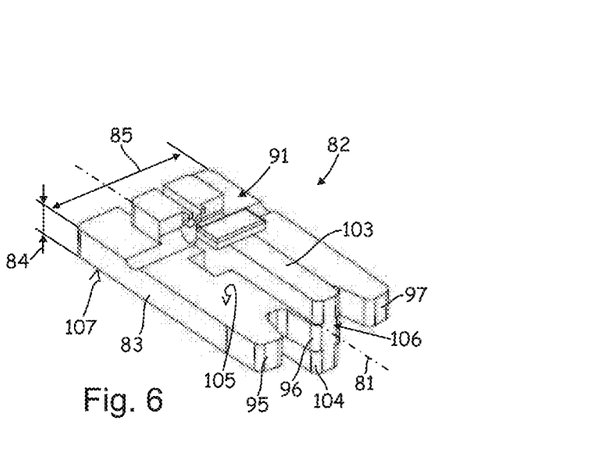
FIG. 6 shows a schematic and perspective view of the locking member.

The horizontal movement device 9, which is shown in more detail in particular in FIGS. 2 and 3, comprises a longitudinal adjustment means 20, a transverse adjustment means 21 and a rotary adjustment means 22, so as to be able to move and/or adjust the commercial vehicle seat 1 in terms of the above-mentioned longitudinal adjustment direction 11, the lateral adjustment direction 12 and the rotary adjustment direction 13, respectively. In another, no less advantageous embodiment example, the horizontal movement device 9 may also include just one of the adjustment means 20, 21 and 22 or any desired other combination thereof.

By means of the longitudinal adjustment means 20, a front longitudinal adjustment track of 120 mm and a rear longitudinal adjustment track of 90 mm in relation to a neutral longitudinal position can be achieved, whereas the transverse adjustment means 21 can be used to achieve a transverse adjustment track about a neutral transverse position of +/−25 mm. By means of the rotary adjustment means 22, a pivot movement of 60° about a neutral rotary position and/or a 180° rotation in intervals of 7.5° can respectively be achieved.

The longitudinal adjustment means 20 is located substantially at a horizontal level of the rotary adjustment means 22, as a result of which the horizontal movement device 9 has an extremely flat profile. The longitudinal adjustment means 20 essentially comprises a right-hand longitudinal rail unit 25 and a left-hand longitudinal rail unit 26 (see FIG. 3), wherein each of the longitudinal rail units 25, 26 comprises a guide rail member 27 (only one example numbered) and a slide rail member 28 (also just one example numbered). The guide rail member 27 is here screwed to the ceiling plate 17 of the vertical movement device 10 and is thus mounted above the vertical movement device 10 between the latter and the seat portion 2.

Moreover, in this embodiment example, the longitudinal adjustment means 20 has associated therewith a double arresting unit 30, by means of which the respective slide rail member 28 can be locked and respectively unlocked on the respective guide rail member 27, so that the commercial vehicle seat 1 can be fixed or moved in the longitudinal adjustment direction 11.

In order to enable the passenger to actuate the double arresting unit 30 manually, the longitudinal adjustment means 11 further comprise a manually actuatable handle member 31, which is provided integrated next to the seat portion 2 in an operating console 32 of the commercial vehicle seat 1.

The slide rail members 28 of the longitudinal rail units 25 and 26, the double arresting unit 30 and also the manually actuatable handle member 31 with its mechanics are fastened to a base carrier plate portion 33 of the horizontal movement device 9, to which also transverse rail units 34 and 35 of the transverse adjustment means 21 are fixed. Each of the transverse rail units 34 and 35 has a guide rail transverse member 36 and a guide rail transverse member 37, in order to enable a movement according to the lateral adjustment direction 12 to be carried out.

Moreover, the representations according to FIGS. 1 to 3 show further components of the transverse adjustment means 21, such as for example a manually actuatable lever member 38 (see in particular FIG. 2) of a locking unit 39 for fixing or releasing the transverse adjustment means 21, as well as damper member 40 (only one example numbered, see FIG. 3) for damping a lateral oscillation with a released transverse adjustment means 21. The respective guide rail transverse member 36 is screwed to the base carrier plate part 33, whereas the slide rail transverse member 37 correspondingly guided on the guide rail transverse member 36 is respectively provided on a bottom shell portion 45.

In this embodiment example, the bottom shell unit 45 is part of the rotary adjustment means 22 and forms, together with a correspondingly shaped two-layered top shell portion 46, a support for a ball bearing unit 47. On the underside, the ball bearing unit 47 is completed and protected by a cover member 49, which forms the second part of the two-layered top shell portion 46 and by means of which the bottom shell portion 45, the top shell portion 46 and thus also the ball bearing unit 47 of the rotary adjustment means 22 are clamped together. To this end, bolt nuts 50 are screwed together with corresponding threaded bolts 51 of the cover member 49.

Further, the bottom shell portion 45 forms a rotationally fixed stationary shell portion 45A of the rotary adjustment means 22, which is integrated in the seat substructure 7 in a rotationally fixed manner, whereas the present two-layered top shell portion 46 correspondingly forms a rotary shell portion 46A that is rotatable relative to the fixed shell portion 45A, which is rotatably supported by means of the cover member 49 by two ball race portions 70 and 71 of the ball bearing unit 47 on the stationary shell portion 45A about the vertical axis 14.

Moreover, the ball bearing unit 47 is characterised by circular ball tracks 72 and 73 (see FIG. 3), along which the plurality of balls 74 (here only one example numbered) of the spherical ring portions 70 and 71 can roll when the rotary shell portion 46A rotates about the vertical axis 14.

In particular the first circular ball track 72 is formed by a plate-shaped recess 75 that is pressed into the stationary shell portion 45A, wherein the rotary shell portion 46A has a formation that is complementary thereto. The same applies to the second circular ball track 73 with regard to the cover member 49 (which therefore has no special reference numeral).

Advantageously, the ball bearing unit 47 is oriented, at least partially, in a horizontal plane (here not explicitly shown), in which also the two longitudinal rail units 26 and 27 are at least partially provided, so that the design height of the present horizontal movement device 9 is again drastically reduced.

The term "horizontal plane" in terms of the present invention is to be understood to mean that this level extends in the width direction of the vehicle and in the longitudinal direction of the vehicle and is oriented horizontally only if the commercial vehicle is located on a horizontally oriented ground. Otherwise, this level is inclined in line with the inclination of the entire commercial vehicle in correspondence with the width direction of the vehicle and the longitudinal direction of the vehicle.

As can well be seen in particular in the representations of FIGS. 4 to 8, the rotary adjustment means 22 is secured against an unintended rotary movement about the vertical axis 14 by means of a locking means 80. To this end, the locking means 80 comprises a locking member 82 for fixing the rotary adjustment means 22, which locking member 82 is supported so as to be translationally displaceable along a displacement axis 81.

According to the invention, the locking member 82 has a base body member 83 that is secured against rotation about the displacement axis 81, the base body height 84 of which base body member is in this embodiment example six times lower than the base body width 85 thereof.

Thus, it has a particularly flat profile and can be placed between a first guide plate member 86 and a second guide plate member 87 (see also FIGS. 8 to 11).

Advantageously, the two guide plate members 86 and 87 are here identical with the two parts of upper shell portion 46 and cover member 49 of the rotary shell portion 46A, so that components of the rotary adjustment means 22 and components of the locking means 80 are implemented to be identical. In so far, the two guide plate members 86 and 87 require at the same time a first ball bearing plate member 86A of the rotary adjustment means 22 and a second ball bearing plate member 87A of the rotary adjustment means 22.

Moreover, the locking member 82 is supported between the two guide plate members 86, 87 by means of an engagement spring member 82 in a spring-mounted manner and can be displaced in combination, in line with demand, along the displacement axis 81 by means of a Bowden cable 89 of a Bowden cable unit 90. In so far, the locking member 82 also comprises a Bowden cable clamping bracket 91.

A further simplification to the locking unit 80 is achieved by means of the fact that it comprises a gear ring plate member 92 with gear ring toothing 93 which is formed to be concave. This gear ring plate member 92 is also mounted between the first and second guide plate member 86, 87 and is identical with the bottom shell portion 45 of the rotary shell portion 45A, which comprises the gear ring 57. In so far, the design of the seat substructure 7 is substantially simplified further.

In order to ensure that the locking member 82 for locking the rotary adjustment means 22 can correspond without any restrictions with the gear ring 57 of the stationary shell portion 45A or respectively the gear ring toothing 93 of the gear ring plate member 92, the present locking member 82 is also characterised by a tooth member unit 94 which comprises a total of three tooth members 95, 96 and 97. By means of these tooth members 95, 96 and 97, the locking member 82 can engage in the gear ring toothing 93 of the stationary gear ring 57, as a result of which the rotary adjustment means 22 is altogether locked.

Figure 7:
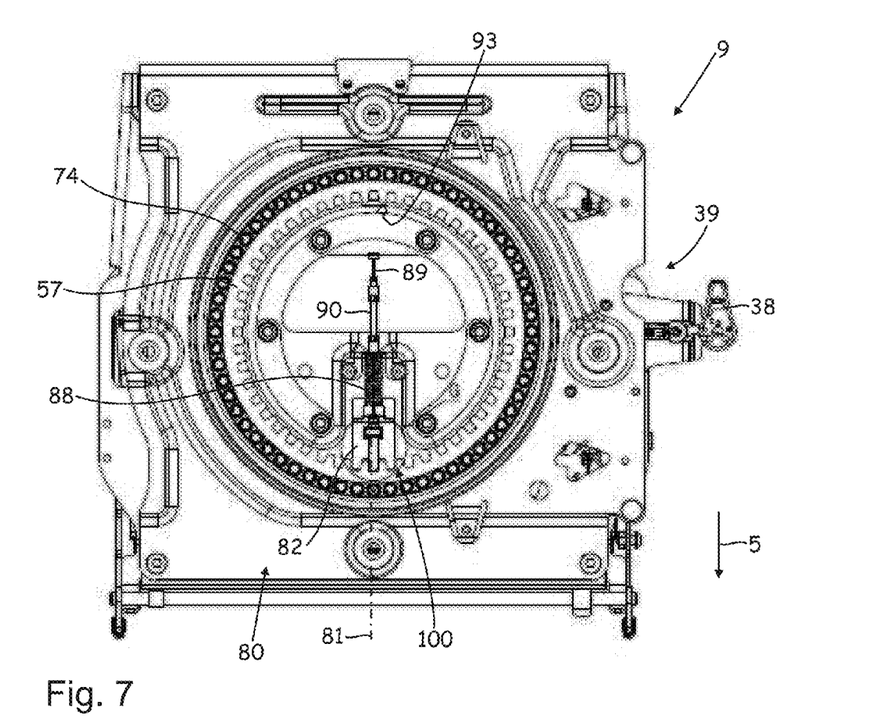
FIG. 7 shows a further schematic top view of the locking means integrated in the horizontal movement device, which has a locking member engaged in the gear ring.
Figure 8:
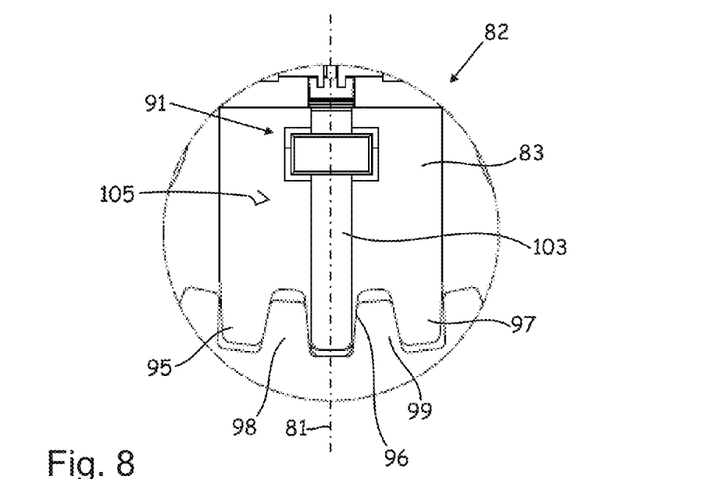
FIG. 8 shows a schematic detailed view of the locking member engaged in the gear ring.

Advantageously, the locking member 82 with these three tooth members 95, 96, 97 can be engaged with at least two gear ring tooth members 98 and 99 of the gear ring toothing 93, as a result of which the gear ring plate member 92 is always blocked in an operationally safe manner in both rotary directions according to the rotary adjustment direction 13 (see FIG. 1) (cf. FIGS. 7 and 8).

The locking member 82 is particularly securely guided along the displacement axis 81 by means of a slot and key unit 100 of the locking means 82.

The slot and key unit 100 comprises here a first slot 101 which is inserted into the first guide plate member 86 in the direction of the displacement axis 81, and a second slot 102, which is correspondingly inserted into the second guide plate member 87 in the direction of the displacement axis 81.

In addition, the slot and key unit 100 on the locking member 82 comprises a first key portion 103 which, in the assembled state of the locking means 80, corresponds to the first slot 101. A second key portion 104 of the locking member 82 then analogously corresponds to the second slot 102.

The first key portion 103 is presently provided on the upper side 105 of the locking member 82, which faces the first guide plate member 86, and this first key portion 103 is pulled to the top end 106 of the central tooth member 96.

The second key portion 104, however, is located on the underside 107 of the locking member 82, which consequently faces the second guide plate member 87, and this second key portion 104 is also pulled to the top end 106 of the central tooth member 96.

As a result of these design measures, the locking member 82 is generally particularly well secured against tilting about the displacement axis 81.

Figure 9:
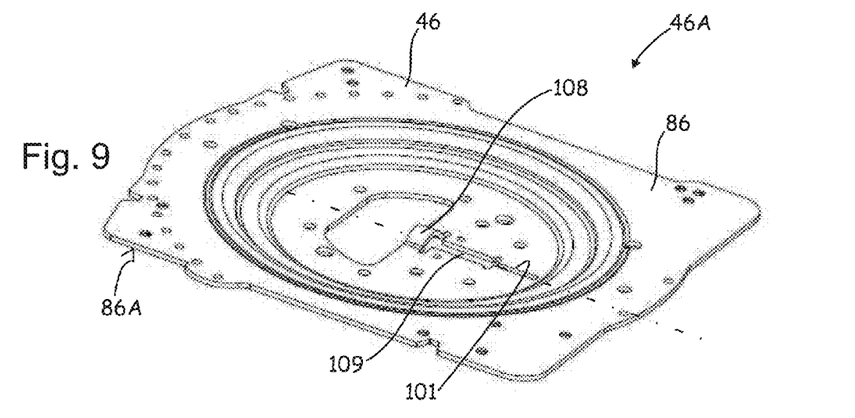
FIG. 9 shows a schematic and perspective view of a first guide plate member of the locking means.
Figure 10:
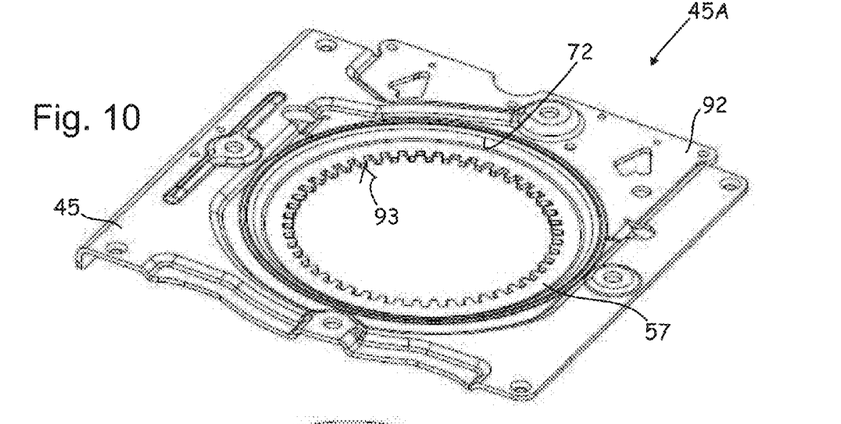
FIG. 10 shows a schematic and perspective view of a gear ring plate member of the locking means.

On the first guide plate member 86, which is shown in FIG. 9, a positioning tab 108 can be clearly seen, by means of which the Bowden cable unit 90 can be additionally fixed. Between the positioning tab 108 and the first slot 101, a positioning opening 109 for accommodating the Bowden cable unit 90 is also provided.

Figure 11:
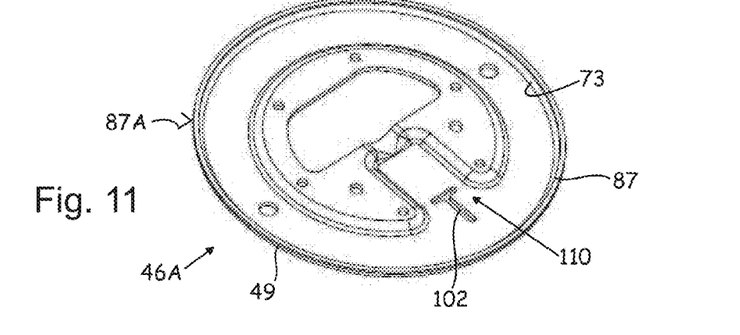
FIG. 11 shows a schematic and perspective view of a second guide plate member of the locking means.

According to the representation according to FIG. 11, an embossed region 110 is also provided on the second guide plate member 87 behind the second slot 102, which embossed region is used for accommodating the Bowden cable unit 90 and the locking member 82.

Depending on whether the commercial vehicle seat 1 is a driver's seat or a passenger's seat, the design in respect of the seat substructure 7 with regard to the x axis can be reversed like a mirror image, which means the operating console 32 and in particular the manually actuatable handle member 31 can be provided on the right-hand side of the commercial vehicle seat instead of the left-hand side of the commercial vehicle seat.

It will be understood that the embodiment example explained above is merely a first embodiment of the subject according to the invention. In so far, the embodiment of the invention is not limited to this embodiment example.

All of the features disclosed in the application documents are claimed as being essential to the invention in so far as they are novel over the prior art either individually or in combination.

LIST OF REFERENCE NUMERALS

1 Commercial vehicle seat
2 Seat portion
3 Backrest portion
4 Headrest portion
5 Forward driving direction
6 Armrest portion
7 Seat substructure
8 Body portion
9 Horizontal movement device
10 Vertical movement device
11 Longitudinal adjustment direction
12 Lateral adjustment direction
13 Rotary adjustment direction
14 Vertical axis
15 Vertical adjustment direction
16 Scissor-like frame
17 Ceiling plate
18 Base plate
19 Damper spring means
20 Longitudinal adjustment means 21 Transverse adjustment means
22 Rotary adjustment means
25 Right-hand longitudinal rail unit
26 Left-hand longitudinal rail unit
27 Guide rail member
28 Slide rail member
30 Double arresting unit
31 Handle member
32 Operating console
33 Base carrier plate portion
34 Front transverse rail unit
35 Rear transverse rail unit
36 Guide rail transverse member
37 Slide rail transverse member
38 Lever member
39 Locking unit
40 Damper members
45 Bottom shell portion
45A Fixed shell portion
46 Top shell portion
46A Rotary shell portion
47 Ball bearing unit
49 Cover member
50 Bolt nuts
51 Threaded bolts
57 Gear ring
70 First ball race portion
71 Second ball race portion
72 First circular ball track
73 Second circular ball track
74 Balls
75 Plate-shaped recess
80 Locking means
81 Displacement axis
82 Locking member
83 Base body member secured against rotation
84 Base body height
85 Base body width
86 First guide plate member
86A First ball bearing plate member
87 Second guide plate member
87A Second ball bearing plate member
88 Engagement spring member
89 Bowden cable
90 Bowden cable unit
91 Bowden cable clamping bracket
92 Gear ring plate member
93 Gear ring toothing
94 Tooth member unit
95 First tooth member
96 Second tooth member
97 Third tooth member
98 First gear ring tooth member
99 Second gear ring tooth member
100 Slot and key unit
101 First slot
102 Second slot
103 First key portion
104 Second key portion
105 Upper side
106 Top end
107 Underside
108 Positioning tab
109 Positioning opening
110 Embossed region

What is claimed is:

1. A commercial vehicle seat comprising:
a seat portion, with a backrest portion and with a seat substructure for mounting on a body portion of a commercial vehicle, wherein the seat substructure comprises locking means for securing against an unintended rotary movement of a rotary adjustment means for rotating at least the seat portion relative to the body portion, wherein said locking means comprise a locking member supported so as to be translationally displaceable along a displacement axis, for fixing said rotary adjustment means,
wherein said locking member comprises a base body member secured against rotation about the displacement axis, a height of the base body member is at least two times smaller than a width of the base body member, wherein the locking member comprises a slot and key unit comprising a first key portion provided on a first one of an upper side and under side of the base body member.

2. The commercial vehicle seat as claimed in claim 1, wherein the slot and key unit guides the locking member along the displacement axis.

3. The commercial vehicle seat as claimed in claim 1, wherein the locking member has a second key portion of the slot and key unit on a second one of the upper side and the under side of the base body member.

4. The commercial vehicle seat as claimed in claim 1, wherein the locking member has at least one tooth member for engaging in gear ring toothing, which is formed at least partially by the first key portion of the slot and key unit.

5. The commercial vehicle seat as claimed in claim 1, wherein the locking member has a tooth member unit with three tooth members, by means of which the locking member can engage in gear ring toothing of a stationary gear ring.

6. The commercial vehicle seat as claimed in claim 1, wherein the locking member comprises a tooth member and the locking means further comprisese a stationary gear ring comprising gear ring toothing, wherein the locking member is in engagement with at least two gear ring tooth members of the gear ring toothing for locking the rotary adjustment means.

7. The commercial vehicle seat as claimed in claim 1, wherein the locking means comprise an engagement spring member for engaging a tooth member unit of the locking member in gear ring toothing mounted to be stationary, wherein the engagement spring member is oriented horizontally at a level of the tooth member unit.

8. The commercial vehicle seat as claimed in claim 1, wherein the locking member is supported in a spring-mounted manner between a first guide plate member and a second guide plate member of the locking means.

9. The commercial vehicle seat as claimed in claim 1, wherein the locking means comprises a gear ring plate member with a gear ring having gear ring toothing that is formed to be concave, wherein the gear ring plate member is provided between a first and a second gear ring plate member of the locking means.

10. The commercial vehicle seat as claimed in claim 8, wherein the first guide plate member comprises a first ball bearing plate member of the rotary adjustment means and the second guide plate member comprises a second ball bearing plate member of the rotary adjustment means, wherein the guide plate members included circular ball tracks of the rotary adjustment means.

11. The commercial vehicle seat as claimed in Claim 1, wherein the locking member has a tooth member adapted to engage gear ring toothing formed on a radially inward portion of a stationary gear ring.

12. A vehicle seat for a commercial vehicle, comprising:
a seat portion including the backrest portion; and
a seat substructure for mounting the vehicle seat on a body portion of the commercial vehicle the seat substructure including:
a rotary adjustment element adapted to rotate at least the seat portion of the vehicle seat relative to the body portion of the commercial vehicle; and
a locking unit for fixing the rotary adjustment element against unintended rotary movement, the locking unit including a locking member supported so as to be translationally displaceable along a displacement axis, the locking member including a base body member secured against rotation about the displacement axis by a slot and key element comprising a first key portion provided on a first one of an upper side and a lower side of the base body member, wherein a height of the base body member is at least two times smaller than a with of the base body member.

* * * * *